(12) United States Patent
Wang et al.

(10) Patent No.: US 9,697,604 B2
(45) Date of Patent: Jul. 4, 2017

(54) IMAGE CAPTURING DEVICE AND METHOD FOR DETECTING IMAGE DEFORMATION THEREOF

(71) Applicant: Altek Semiconductor Corp., Hsinchu (TW)

(72) Inventors: Yu-Chih Wang, Tainan (TW);
Hong-Long Chou, Hsinchu (TW);
Che-Lun Chuang, Hsinchu (TW);
Yao-Sheng Wang, Tainan (TW)

(73) Assignee: Altek Semiconductor Corp., Hsinchu (TW)

( * ) Notice: Subject to any disclaimer, the term of this patent is extended or adjusted under 35 U.S.C. 154(b) by 232 days.

(21) Appl. No.: 14/303,568

(22) Filed: Jun. 12, 2014

(65) Prior Publication Data
US 2015/0213588 A1    Jul. 30, 2015

(30) Foreign Application Priority Data
Jan. 28, 2014   (TW) .............................. 103103259 A (51) Int. Cl.
*H04N 13/00*    (2006.01)
*G06T 7/00*    (2017.01)
(Continued)

(52) U.S. Cl.
CPC ................ *G06T 7/002* (2013.01); *G06T 7/85* (2017.01); *H04N 13/0246* (2013.01);
(Continued)

(58) Field of Classification Search
None
See application file for complete search history.

(56) References Cited

U.S. PATENT DOCUMENTS

2007/0296721 A1*  12/2007  Chang ..................... G06T 15/10
                                                                    345/427
2008/0306708 A1    12/2008  Germain, IV et al.
(Continued)

FOREIGN PATENT DOCUMENTS

CN           102428707          4/2012
CN           102905147          1/2013
(Continued)

OTHER PUBLICATIONS

Lei et al., "Direct Image Matching by Dynamic Warping," Conference on Computer Vision and Pattern Recognition Workshop, Jun. 27-Jul. 1, 2004, pp. 1-5.
(Continued)

*Primary Examiner* — Kate Luo
(74) *Attorney, Agent, or Firm* — Jianq Chyun IP Office (57) ABSTRACT

An image capturing device and a method for detecting image deformation thereof are provided. The method is for the image capturing device having a first sensor and a second image sensor, and the method includes the following steps. A first image is captured through the first image sensor, and a second image is captured through the second image sensor. A deform detection is performed according to the first and second images so as to obtain a comparison information between the first and second images. Whether a coordinate parameter relationship between the first and second images being varied is determined according to the comparison information, in which the coordinate parameter relationship is associated with a spatial configuration relationship between the first and second image sensors.

12 Claims, 5 Drawing Sheets

(51) Int. Cl.
    *H04N 13/02*     (2006.01)
    *G06T 7/80*     (2017.01)

(52) U.S. Cl.
    CPC   *G06T 2200/04* (2013.01); *G06T 2207/10012* (2013.01); *H04N 2013/0081* (2013.01)

(56) References Cited

U.S. PATENT DOCUMENTS

| | | | | |
|---|---|---|---|---|
| 2011/0025829 | A1* | 2/2011 | McNamer | H04N 13/021 348/50 |
| 2011/0110583 | A1* | 5/2011 | Zhang | G06T 7/0071 382/154 |
| 2011/0222757 | A1 | 9/2011 | Yeatman, Jr. et al. | |
| 2012/0069149 | A1* | 3/2012 | Masuda | G01B 11/24 348/46 |
| 2013/0235213 | A1* | 9/2013 | Kennedy | G06T 7/002 348/187 |
| 2013/0321588 | A1* | 12/2013 | Abraham | H04N 13/0239 348/47 |
| 2015/0103148 | A1* | 4/2015 | Masuda | G01C 3/06 348/47 |

FOREIGN PATENT DOCUMENTS

| | | |
|---|---|---|
| CN | 103444191 | 12/2013 |
| TW | 201220251 | 5/2012 |
| TW | 201320714 | 5/2013 |
| WO | 2014002725 | 1/2014 |

OTHER PUBLICATIONS

"Office Action of Taiwan Counterpart Application", issued on Jul. 17, 2015, p. 1-p. 5.

"Office Action of China Counterpart Application", issued on May 24, 2016, p. 1-p. 7.

* cited by examiner

IMAGE CAPTURING DEVICE AND METHOD FOR DETECTING IMAGE DEFORMATION THEREOF

CROSS-REFERENCE TO RELATED APPLICATION

This application claims the priority benefit of Taiwan application serial no. 103103259, filed on Jan. 28, 2014. The entirety of the above-mentioned patent application is hereby incorporated by reference herein and made a part of this specification.

BACKGROUND OF THE INVENTION

1. Field of the Invention

The invention generally relates to an image capturing device, and more particularly, to a method for detecting image deformation and an image capturing device using the same.

2. Description of Related Art

For the current depth image sensing technique, it is commonly seen that image capturing devices with binocular lenses are employed to capture images corresponded to various view angles, so that three-dimensional (3D) depth information of a target object may be calculated by the images corresponded to various view angles. Therefore, in order to precisely obtain the 3D depth information of the target object from the 2D images, the spatial configuration between the two lenses has to be specifically designed and the delicate parameter calibration is a necessary procedure. To be more specific, when the manufactures fabricate the image capturing devices with binocular lenses, each corresponding spatial position of the binocular lenses is incapable of being accurately disposed on the precise pre-determined settings. As such, during the process of fabricating the image capturing devices, the manufacturers calibrate the disposed binocular lenses modules in advance, and thus a set of factory-default calibrating parameters is obtained. In the future, the image capturing device may employ these factory-default calibrating parameters to calibrate the images captured by the binocular lenses during the process of users operating the image capturing device, so as to overcome the lack of precision in the processes of fabricating the image capturing devices.

However, during the process of users operating or carrying the image capturing device, it is possible to cause the spatial position variation of lenses (such as, displacement or rotation) as the image capturing device being extruded, impacted or dropped. Once the circumstance of the lens being displaced or deformed occurs, these factory-default calibrating parameters are no longer complied with the current application circumstance, such that the image capturing device is incapable of obtaining the correct depth information. For example, if the horizontal disequilibrium has occurred between the binocular lenses of the stereoscopic image capturing device, due to the horizontals of the captured left-frames and right-frames are mismatched after the disequilibrium, the 3D photographing effects are lead to be poor.

SUMMARY OF THE INVENTION

Accordingly, the invention is directed to an image capturing device and a method for detecting an image deformation thereof, which is capable of instantly detecting whether the deformation of the binocular images is occurred during the use of the image capturing device, so as to further execute the real-time correction on the images.

The invention provides a method for detecting the image deformation, which is for an image capturing device having a first image sensor and a second image sensor. The method includes the following steps. A first image is captured through the first image sensor, and a second image is captured through the second image sensor. A deform detection is performed according to the first image and the second image, so as to obtain a comparison information between the first and second images. Whether a coordinate parameter relationship between the first and second images being varied is determined according to the comparison information, in which the coordinate parameter relationship is associated with a spatial configuration relationship between the first and second image sensors.

In an embodiment of the invention, the step of performing the deform detection according to the first and second images to obtain the comparison information between the first and second images includes: respectively performing a feature detection on the first image and the second image to obtain a plurality of first features of the first image and a plurality of second features of the second image, comparing coordinate positions of the first features with coordinate positions of the second features respectively corresponding to the first features, so as to obtain a plurality of displacement information between the first features and second features, and calculating the displacement information to obtain a relative rotational angle between the first image and second image.

In an embodiment of the invention, before the step of respectively performing the feature detection on the first image and the second image to obtain the plurality of first features of the first image and the plurality of second features of the second image, the method further includes the following steps. Whether the first image and the second image belong to a same image group is determined according to image information of the first image and second image. When the first image and the second image belong to the same image group, an image rectification is performed on the first image and second image through a current calibration parameter.

In an embodiment of the invention, the step of determining whether the coordinate parameter relationship between the first and second images is varied according to the comparison information includes: determining the coordinate parameter relationship between the first image and second image is varied when the relative rotational angle is greater than a threshold value.

In an embodiment of the invention, the first image sensor captures the first image for a target object and the second image sensor captures the second image for the target object, and the step of performing the deform detection according to the first image and second image to obtain the comparison information between the first image and second image includes: performing a three-dimensional depth estimation according to the first image and second image to generate a corresponding depth information of the target object and obtaining a depth focus position associated with the target object according to the depth information, obtaining an autofocus position associated with the target object through an autofocus procedure, and comparing the depth focus position and the autofocus position to obtain a focal length difference.

In an embodiment of the invention, the step of determining whether the coordinate parameter relationship between the first and second images is varied according to the comparison information includes: determining the coordinate parameter relationship between the first image and second image is varied when the focal length difference is greater than a threshold value.

In an embodiment of the invention, the method for detecting the image deformation further includes the following steps. An image rectification is performed on the first and second images through a current calibration parameter. When the coordinate parameter relationship between the first and second images is varied, a dynamic warping procedure is performed on the first and second images, so as to calibrate the coordinate parameter relationship between the first and second images.

From another perspective, the invention provides an image capturing device. The image capturing device has a first image sensor and a second image sensor, and the image capturing device also includes a storage unit and a processing unit. The storage unit records a plurality of modules. The processing unit is coupled to the first image sensor, the second image sensor and the storage unit, so as to access and execute the modules recorded in the storage unit. The modules include a capturing module, a deform detecting module and a determining module. The capturing module captures a first image through the first image sensor and captures a second image through the second image sensor. The deform detecting module performs a deform detection according to the first and second images, so as to obtain a comparison information between the first and second images. The determining module determines whether a coordinate parameter relationship between the first and second images is varied according to the comparison information, in which the coordinate parameter relationship is associated with a spatial configuration relationship between the first and second image sensors.

In an embodiment of the invention, the storage unit further stores a current calibration parameter, and the modules further include a dynamic warping module. The dynamic warping module performs an image rectification on the first and second images through the current calibration parameter. When the coordinate parameter relationship between the first and second images is varied, the dynamic warping module performs a dynamic warping procedure on the first and second images, so as to calibrate the coordinate parameter relationship between the first and second images.

In light of the above, the method for detecting image deformation provided by the embodiments of the invention may instantly detect whether the image deformation is occurred. To be specific, the method for detecting image deformation may detect whether the calibration parameters currently utilized for calibrating the first and second images are able to perform the accurate calibration. By this way, the image capturing device in the invention is capable of performing the deform detection correctly, automatically and instantly, in the process of the user operates the image capturing device. Accordingly, when the occurrence of deformation is detected, the further correction and improvement may be executed to avoid continuously using the calibration parameters that no longer complied with the current situation to perform the image rectification, and simultaneously, to enhance the accuracy of the depth information calculation.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

While image capturing devices are in the factory, the spatial configuration relationship between the binocular lenses thereof have already been calculated and adjusted precisely, and accordingly, a set of factory-default calibrating parameters is generated. The presetting of factory-default calibrating parameters is configured to calibrate the images captured by the various lenses to have a designed and fixed coordinate parameter relationship. In order to resolve the circumstance that these factory-default calibrating parameters are no longer applicable due to the binocular lenses being displaced or rotated, the claimed invention instantly utilizes the left-image and right-image to perform a deform detection, and accordingly determines whether the circumstance that the factory-default calibrating parameters or the current calibration parameter is no longer applicable has occurred. Below, embodiments of the invention will be described as implementation examples of the invention.

Figure 1:
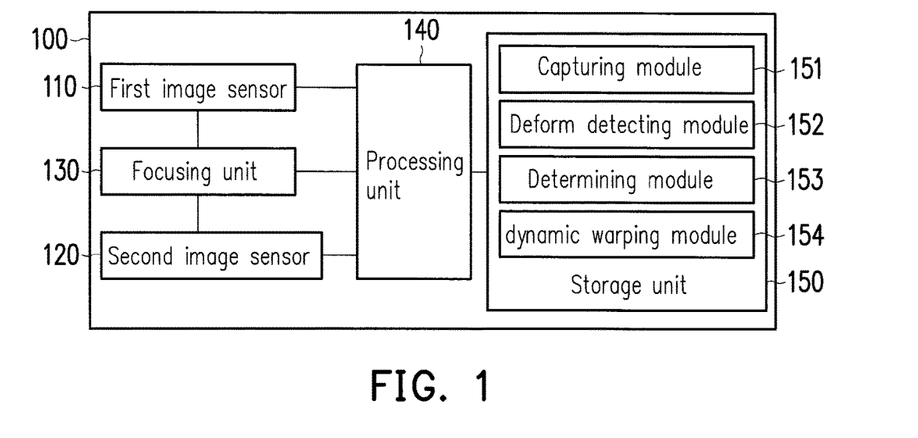
FIG. 1 is a block diagram illustrating an image capturing device according to an embodiment of the invention.

FIG. 1 is a block diagram illustrating an image capturing device according to an embodiment of the invention. Referring to FIG. 1, the image capturing device 100 of the embodiment may be a digital camera, a digital camcorder or other handheld electronic devices with image capturing function (such as smart phones, tablet PCs, etc.), although the invention is not limited thereto. The image capturing device 100 includes a first image sensor 110, a second image sensor 120, a focusing unit 130, a processing unit 140 and a storage unit 150.

The first image sensor 110 and the second image sensor 120 may include a lens and photosensitive elements. The photosensitive elements may be a charge coupled device (CCD), a complementary metal-oxide semiconductor (CMOS) or other elements, in which the first image sensor 110 and the second image sensor 120 may also include apertures etc., although the invention is not limited thereto. Besides, the lenses of the first image sensor 110 and the second image sensor 120 may be served as a left lens and a right lens, according to the lens configuration positions of the first image sensor 110 and the second image sensor 120.

In the embodiment, the focusing unit 130 is coupled to the first image sensor 110, the second image sensor 120 and the processing unit 140, and is configured to control focal lengths of the first image sensor 110 and the second image sensor 120. In other words, the focusing unit 130 controls the lenses of the first image sensor 110 and the second image sensor 120 to move to an in-focus position. The focusing unit 130 may be a voice coil motor (VCM) or other different types of motors to control the step position of lenses, so as to change the focal lengths of the first image sensor 110 and the second image sensor 120.

The processing unit 140 may be a central processing unit (CPU), a microprocessor, an application specific integrated circuits (ASIC), a programmable logic device (PLD) or hardware devices equipped with computing capability, for instance. The storage unit 150 may be a random access memory, a flash memory or other memories, configured to store data and a plurality of modules, and the processing unit 140 is coupled to the storage unit 150 and configured to execute these modules. The afore-described modules include a capturing module 151, a deform detecting module 152, a determining module 153 and a dynamic warping module 154, in which these modules may be computer programmes that are loaded to the processing unit 140, and thus the detection of image deformation can be executed.

Figure 2:
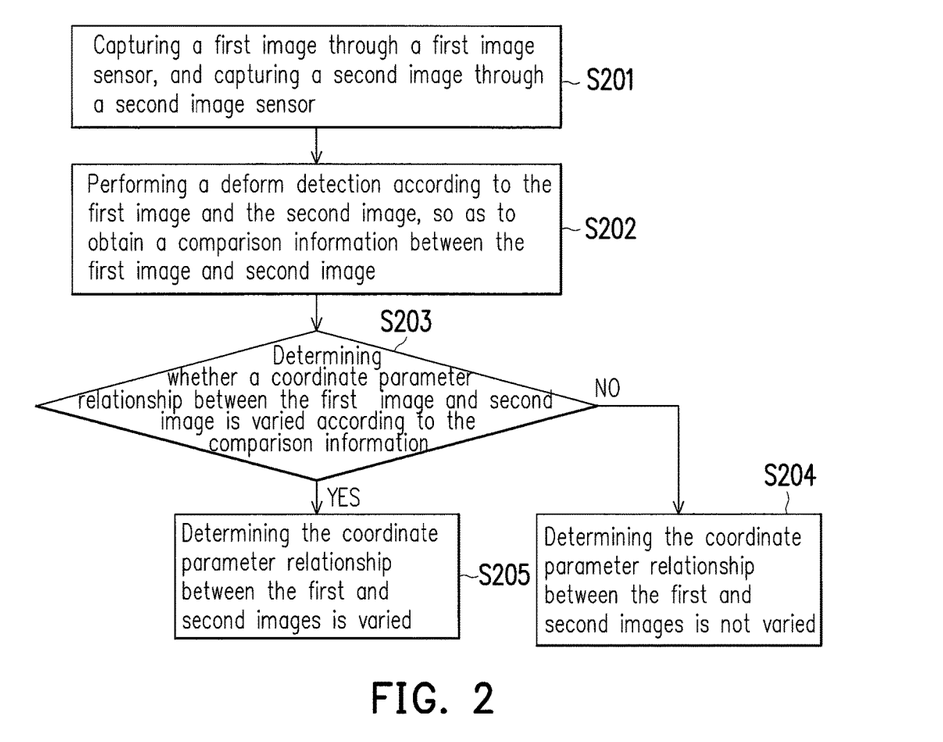
FIG. 2 is a flowchart diagram illustrating a method for detecting image deformation according to an embodiment of the invention.

FIG. 2 is a flowchart diagram illustrating a method for detecting image deformation according to an embodiment of the invention. The method of the embodiment is applicable to the image capturing device 100 depicted in FIG. 1. The details of the method in the embodiment are described accompanying with the elements in the image capturing device 100 as follows.

Firstly, in step S201, the capturing module 151 captures a first image through the first image sensor 110, and captures a second image through the second image sensor 120. In other words, the first image and the second image may be regarded as the left image and the right image corresponding to various view angles, which are captured from a same scene. Moreover, the first image and the second image may be the live-view images captured under the preview state.

It should be noted that, since the first and second images are calibrated through the factory-default calibrating parameters, as employing the first and second images with different view angles to calculate the depth information, the corresponding features on the first and second images are projected onto same coordinate positions under a reference coordinate system after being through coordinate conversion calculation. In case of the features corresponded to each other on the calibrated first and second images are not projected to the same coordinate positions under the reference coordinate system, such instance may be referred as image deformation.

From another perspective, the factory-default calibrating parameters are applicable to the two left and right images so as to respectively perform image rectification afterwards, so that the two real images become to either have horizontal disparity or to have vertical disparity (which is caused by the allocation of lenses), for instance, a difference between elevation of angles of the binocular lenses exists. The image rectification is performed through the factory-default calibrating parameters, such that the real images may be converted into the calibrated images corresponding to the left and right lenses which are allocated on a same image capturing plane with the horizontal or vertical position difference exists. That is to say, under the premise of the left and right lenses being disposed horizontally, each pixel on the left and right images after being image rectified should have the horizontal position difference to be existed. At this time, if the capturing direction of the left and right lenses is changed, the vertical position of each pixel on the left and right images after being image rectified may still remain a difference, which may also be referred as image deformation.

In step S202, the deform detecting module 152 performs the deform detection according to the first and second images, so as to obtain a comparison information between the first and second images. It should be noted that, in one embodiment, the first image and the second image may have already been calibrated through the factory-default calibrating parameters before performing the deform detection. Specifically, through the deform detection of the embodiment, it may be known that whether the left and right images after calibrated through the default calibrating parameters are deformed or skewed, that is, whether the first and second image are calibrated through the current calibration parameter to either have the horizontal disparity or to have vertical disparity, in which the comparison information may be indicated the degree of skew or deform of the left and right images.

In step S203, the determining module 153 determines whether the coordinate parameter relationship between the first and second images is varied according to the comparison information. If the step S203 determines to be no, the determining module 153 determines the coordinate parameter relationship between the first and second images is not varied in step S204. If the step S203 determines to be yes, the determining module 153 determines the coordinate parameter relationship between the first and second images is varied in step S205. It should be noted that, such coordinate parameter relationship is associated with the spatial configuration relationship between the first image sensor 110 and the second image sensor 120.

That is to say, when the spatial configuration relationship between the first image sensor 110 and the second image sensor 120 is changed, the coordinate parameter relationship between the first and second images is varied correspondingly. In case of the determining module 153 determines the coordinate parameter relationship between the first and second images is varied, it indicates that the lens(es) of the first image sensor 110 and/or the second image sensor 120 may be displaced or rotated, and the factory-default calibrating parameters or the current calibration parameter is no longer complied with the current situation. In other words, the set of factory-default calibrating parameters or the current calibration parameter is no longer able to accurately perform the image rectification on the first and second images. Based on the above, the image capturing device 100 may execute the corresponding correction as the image deformation may be detected correctly and instantly, so as to avoid repeatedly using the parameters that are not complied with the current situation to perform the image rectification.

Figure 3:
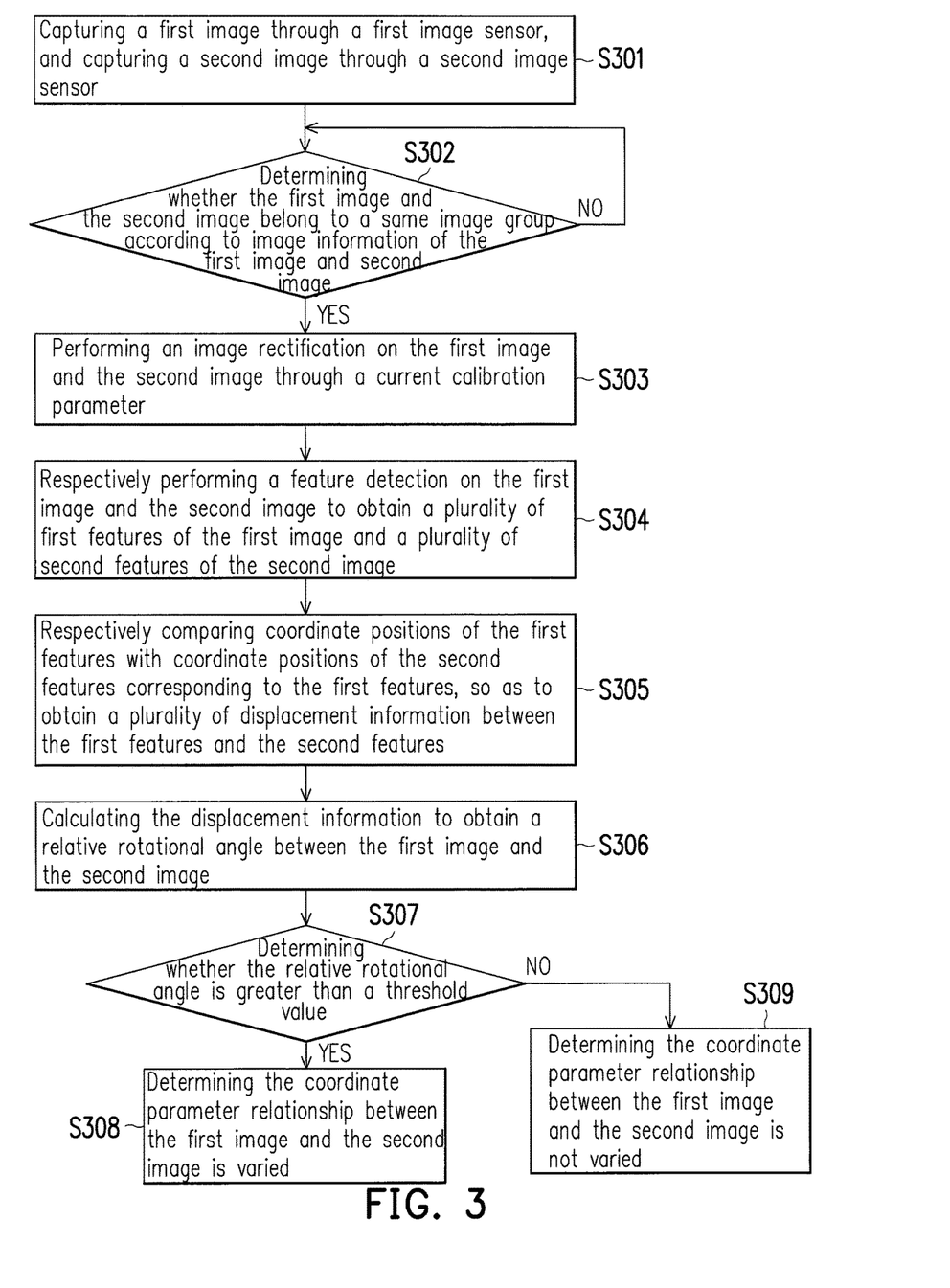
FIG. 3 is a flowchart diagram illustrating a method for detecting image deformation according to another embodiment of the invention.

The details of utilizing the first and second images to perform the deform detection are described in the following exemplary embodiments. FIG. 3 is a flowchart diagram illustrating a method for detecting image deformation according to another embodiment of the invention. Referring to FIG. 3, the method of the embodiment is applicable to the image capturing device 100 depicted in FIG. 1. The details of the method in the embodiment are described accompanying with the elements in the image capturing device 100 as follows.

Firstly, in step S301, the capturing module 151 captures a first image through the first image sensor 110, and captures a second image through the second image sensor 120. In step S302, the deform detecting module 152 determines whether the first image and the second image belong to a same image group according to image information of the first and second images. The image information may be the recorded photographing information while capturing the images, such as the resolution, the focal length, the exposure time or the recording time of the image. Through the comparison of the image information, the deform detecting module 152 may find out whether the first image and the second image are the two images captured at the same time from a same scene.

That is to say, in the embodiment, the single image group has two pictures, in which the images in the same image group are the two images captured by the left and right lenses at the same time from the same scene. In step S303, when the first and second images belong to the same image group, the deform detecting module 152 performs the image rectification on the first and second images through the current calibration parameter. The objective is to maintain the coordinate parameter relationship between the first and second images in a state that is facilitated to calculate the depth information.

In step S304, the deform detecting module 152 respectively performs a feature detection on the first image and the second image, so as to obtain a plurality of first features of the first image and a plurality of second features of the second image. The feature detection is configured to detect a plurality of features in an image, such as the edge detection, the corner detection or other feature detection algorithms, although the invention is not limited thereto.

In step S305, the deform detecting module 152 compares coordinate positions of the first features with coordinate positions of the second features respectively corresponding to the first features, so as to obtain a plurality of displacement information between the first features and the second features. For example, under the premise of the binocular lenses being horizontally disposed, the first and second images are in the state of horizontal and co-linear. As such, the coordinate components of the first features and the corresponding second features along the vertical direction should be identical. Moreover, the coordinate components of each first feature and each corresponding second features along the horizontal direction should have a gap, which may be served as horizontal disparity, which may be referred as the aberration in the horizontal direction.

Therefore, through comparing the coordinate positions of the features on the first and second images, whether the coordinate parameter relationship between the first and second images being varied may be informed. For example, under the premise of the binocular lenses being horizontally disposed, in case of the displacement quantity for the coordinate components of the first features and the corresponding second features along the vertical direction is excessively large, it indicates that the coordinate parameter relationship between the first and second images is varied, and also indicates the spatial positions of the first image sensor 110 and the second image sensor 120 are varied as well. That is to say, it may be informed whether the image deformation is occurred through analyzing and statistically counting the plurality of displacement information between the first and second features.

Besides, in step S306 of the embodiment, the deform detecting module 152 may even calculate these displacement information to obtain a relative rotational angle between the first image and the second image. In brief, the deform detecting module 152 may obtain a rotational quantity between the first and second images according to these displacement quantity corresponding to the various features and the coordinate positions of the features, in which the rotational quantity between the images may be caused by the rotation of the lens module, for instance. Hence, in step S307, the determining module 153 determines whether the relative rotational angle is greater than a threshold value. In step S308, when the relative rotational angle is greater than the threshold value, the determining module 153 determines the coordinate parameter relationship between the first and second images is varied. In step S309, when the relative rotational angle is not greater than the threshold value, the determining module 153 determines the coordinate parameter relationship between the first and second images is not varied.

It should be noted that, in one embodiment, the deform detecting module 152 may also determine whether the coordinate positions of the first features and the corresponding second features being projected are matched with the coordinate positions of the reference coordinate system thereon, and calculates the projection displacement quantity between the two projection points (that is, the projection points of the first features and the second features). When the projection displacement quantity is greater than a threshold value, the deform detecting module 152 then analyzes the coordinate parameter relationship between the first and second images through these projection displacement quantity corresponding to the projection points.

Figure 4:
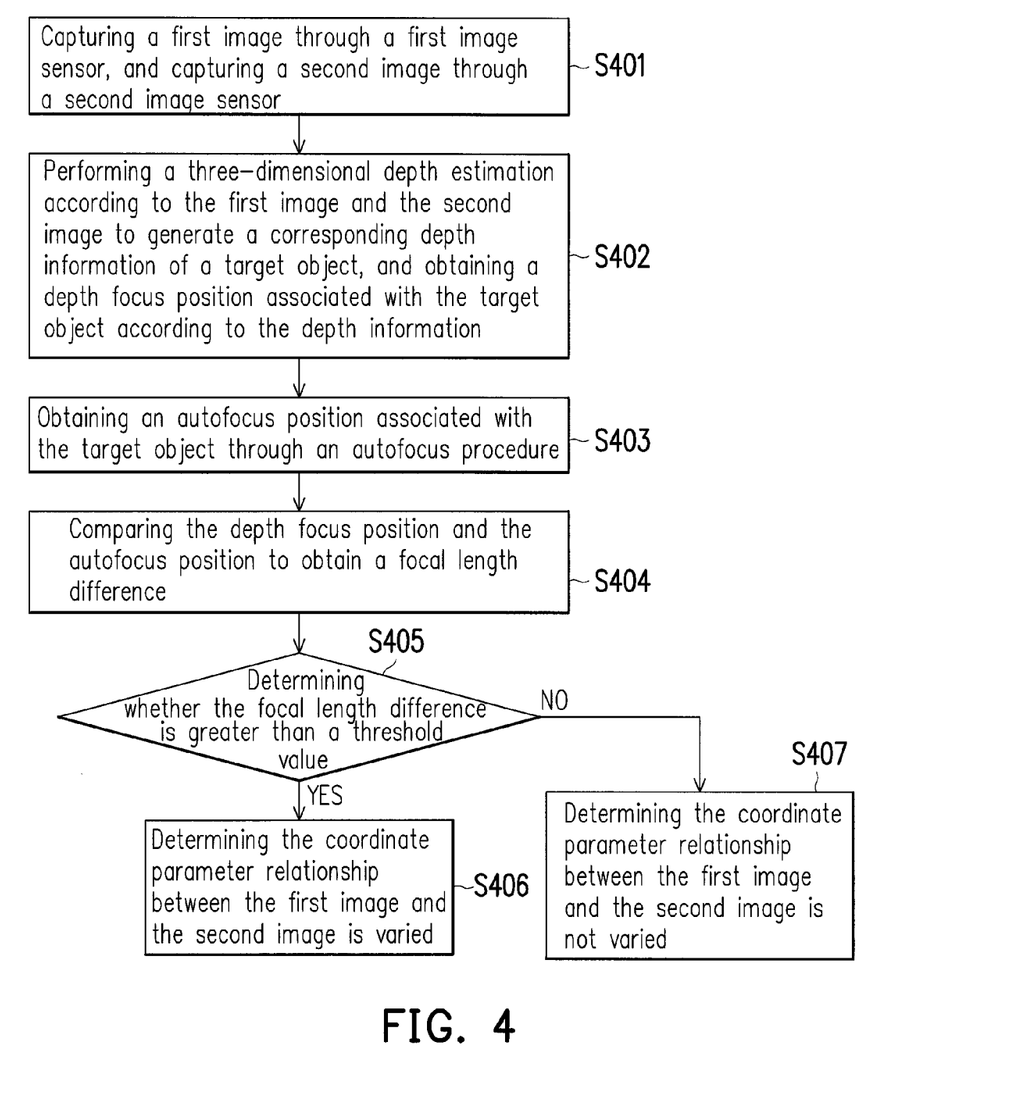
FIG. 4 is a flowchart diagram illustrating a method for detecting image deformation according to yet another embodiment of the invention.

FIG. 4 is a flowchart diagram illustrating a method for detecting image deformation according to yet another embodiment of the invention. Referring to FIG. 4, the method of the embodiment is applicable to the image capturing device 100 depicted in FIG. 1. The details of the method in the embodiment are described accompanying with the elements in the image capturing device 100 as follows.

Firstly, in step S401, the capturing module 151 captures a first image through the first image sensor 110, and captures a second image through the second image sensor 120, in which the first image sensor 110 for a target object captures the first image while the second image sensor 120 for the target object captures the second image. Specifically, in the embodiment, the method for selecting a target object may be selecting the target object through a click signal received by the focusing unit 130 from the user selected. For example, the user may select the target object in a touch manner or through moving the imagecapturing device to a specific region, although the invention is not limited thereto. In other feasible embodiments, the method for selecting a target object may also be automatically selecting the target object and obtaining the coordinate position of the target object through the focusing unit 130 performs an object detection procedure.

In step S402, the deform detecting module 152 performs a three-dimensional depth estimation according to the first and second images to generate the corresponding depth information of the target object, and obtains the depth a depth focus position associated with the target object according to the depth information. Specifically, the deform detecting module 152 may perform an image processing through stereo vision technique, in order to seek the 3D coordinate positions in space and each pixel depth information in images of the target object. Moreover, the step of obtaining the depth focus position associated with the target object according to the depth information may be implemented by obtaining the focus positions associated with the target object through inquiring a depth table according to the piece of depth information, for instance.

Therefore, through seeking the corresponding relationship between the number of steps of the stepping motor or the magnitude of current of the voice coil motor and the clear depth of the target object in advance, the number of steps of the stepping motor or the magnitude of current of the voice coil motor corresponding to the currently obtained depth information of the target object can be inquired, and accordingly, the depth focus position associated with the target object may be obtained.

Subsequently, in step S403, the deform detecting module 152 obtains an autofocus position associated with the target object through an autofocus procedure. Specifically, in the process of executing the autofocus procedure, the lenses of the first image sensor 110 and the second image sensor 120 may be respectively adjusted to the required focus positions through the focusing unit 130 automatically controls the lens module to move in a wide range, so as to obtain the autofocus position associated with the target object. For instance, the focusing unit 130 may employ the hill-climbing method in the autofocus technique to obtain the autofocus position associated with the target object, although the invention is not limited thereto.

In step S404, the deform detecting module 152 compares the depth focus position and the autofocus position to obtain a focal length difference. Generally, the image capturing device 100 is able to obtain a desired depth information when the image capturing device 100 is not suffered from impacts. Once the image capturing device 100 is suffered from impacts, the spatial configuration relationship between the first image sensor 110 and the second image sensor 120 may be varied. The image capturing device 100 is incapable of obtaining the desired depth information according to the previous default calibrating parameters, that is to say, the image capturing device 100 is incapable of estimating the correct depth focus position through the depth information and the depth table recorded beforehand. As such, a difference is generated between the depth focus position and the autofocus position obtained through the autofocus procedure.

Hence, in step S405, the determining module 153 determines whether the focal length difference is greater than a threshold value. In step S406, when the focal length difference is greater than the threshold value, the determining module 153 determines the coordinate parameter relationship between the first and second images is varied. In step S407, when the focal length difference is not greater than the threshold value, the determining module 153 determines the coordinate parameter relationship between the first and second images is not varied.

It should be noted that, when the image capturing device 100 determines the coordinate parameter relationship between the first and second images is varied, it indicates that the current calibration parameter is no longer able to perform the accurate image rectification on the images. Therefore, the depth estimation engine of the image capturing device 100 is no longer capable of generating the desired depth information through the images captured by the binocular lenses. Based on the above, in one embodiment, before the image capturing device 100 updates or corrects the current calibration parameter or the factory-default calibrating parameters, the method for detecting image deformation may further include performing a dynamic warping procedure on the present first and second images so as to further correct the coordinate parameter relationship between the first and second images.

Figure 5:
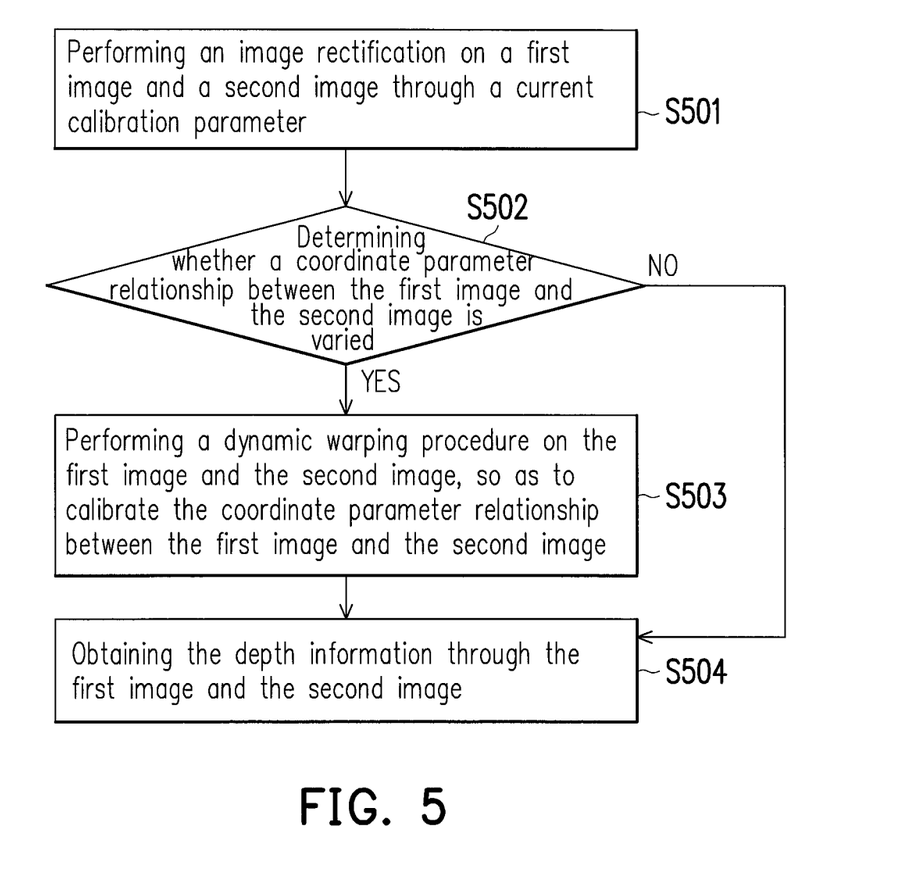
FIG. 5 is a flowchart diagram illustrating a method for detecting image deformation according to still another embodiment of the invention.

In order to illustrate how the image capturing device corrects the present images, FIG. 5 is a flowchart diagram illustrating a method for detecting image deformation according to still another embodiment of the invention. Referring to FIG. 5, in the embodiment, it is assumed that the image capturing device 100 has determined whether the images are deformed according to the afore-described methods, and the method of the embodiment is applicable to the image capturing device 100 depicted in FIG. 1. The details of the method in the embodiment are described accompanying with the elements in the image capturing device 100 as follows.

Firstly, in step S501, the dynamic warping module 154 performs an image rectification on the first image and the second image through the current calibration parameter. Specifically, before the image capturing device 100 calculates the depth information of the images through a depth estimator, the current calibration parameter may be employed to perform the image rectification on the first image and the second image, so as to calibrate the first and second images to the desired spatial corresponding relationship, thereby obtaining the correct depth information. In step S502, the dynamic warping module 154 determines whether the coordinate parameter relationship between the first and second images is varied. Specifically, the dynamic warping module 154 may find out whether the coordinate parameter relationship between the first and second images is varied according to the determination result generated by the determining module 153, in which the details of determining whether the images are deformed are explicitly illustrated in the embodiments depicted in FIG. 2 through FIG. 4, and thus a detailed description thereof will be omitted. When the coordinate parameter relationship between the first and second images is varied, it indicates that the image capturing device 100 is no longer able to calibrate the first and second images to the desired spatial corresponding relationship through the current calibration parameter.

Hence, in step S503, when the coordinate parameter relationship between the first and second images is varied, the dynamic warping module 154 performs the dynamic warping procedure on the first and second images, so as to calibrate the coordinate parameter relationship between the first and second images. Specifically, the objective of the dynamic warping procedure is to calibrate the first and second images to the desired spatial corresponding relationship. For example, the first and second images are calibrated to the state of horizontal and co-linear.

It is known from the embodiment depicted in FIG. 3 that the deform detecting module 152 calculates the rotational quantity between the first and second images through the displacement quantity of the features. Similarly, the dynamic warping module 154 may also seek a set of preferable parameter adjustment information through the displacement quantity of the features or the rotational quantity between the images, so as adjust the first and second images to the desired spatial corresponding relationship. For example, the dynamic warping module 154 may utilize the optimization algorithm and the rotation matrix to look for the preferable rotational adjustment angle, and rotates the left or right image according to the rotational adjustment angle, resulting in the two images being corresponded to the desired coordinate parameter relationship. The optimization algorithm such as gradient decent method, Levenberg-Marquardt method (LM method), Gauss-Newton method etc., may be configured to calculate the preferable rotational adjustment parameter.

Moreover, in the embodiment, the dynamic warping module 154 may adjust the second image based on the first image, and similarly, may adjust the first image based on the second image, so as to adjust the first and second images to the desired spatial corresponding relationship. Additionally, in one embodiment, the dynamic warping module 154 may also adjust the first and second images simultaneously, so as to adjust the first and second images to the desired spatial corresponding relationship.

It should be noted that, in the embodiment, the image rectification has been performed on the first and second images through the current calibration parameter. As such, even the current calibration parameter is unable to calibrate the first and second images to the desired state, the degree of deform between the first and second images has been decreased, so that the computation for seeking the preferable parameter adjustment information may also be reduced. For example, in case of the image rectification is not performed on the first and second images through the current calibration parameter, the dynamic warping module 154 may look for a preferable rotational adjustment angle within a required range of +30 degree to −30 degree. In case of the image rectification is performed on the first and second images through the current calibration parameter, the dynamic warping module 154 may look for a preferable rotational adjustment angle within a required range of +5 degree to −5 degree.

Figure 6A:
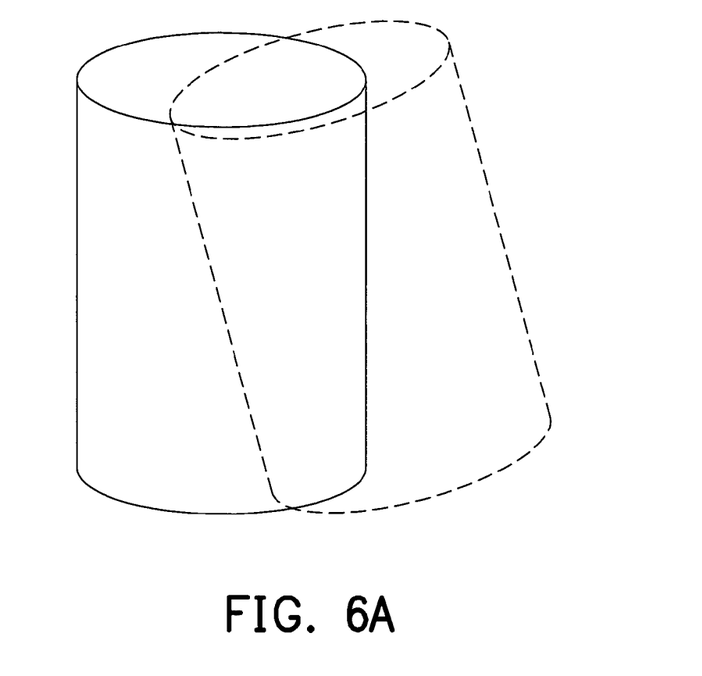
FIG. 6A is a schematic diagram illustrating an example of a first image and a second image without being through a dynamic warping procedure according to an embodiment of the invention.
Figure 6B:
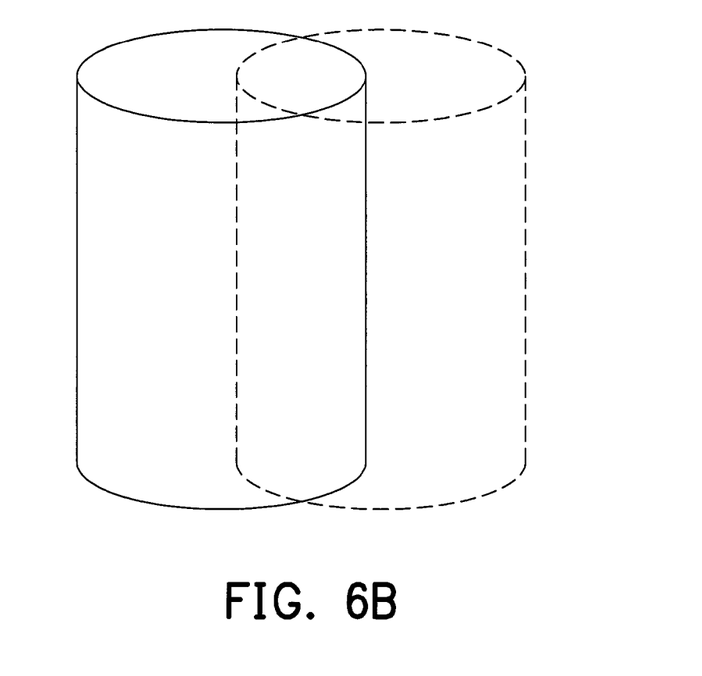
FIG. 6B is a schematic diagram illustrating an example of a first image and a second image after being through a dynamic warping procedure according to an embodiment of the invention.

For example, FIG. 6A is a schematic diagram illustrating an example of a first image and a second image without being through a dynamic warping procedure according to an embodiment of the invention, and FIG. 6B is a schematic diagram illustrating an example of a first image and a second image after being through a dynamic warping procedure according to an embodiment of the invention. Referring to FIG. 6A, when the first and second images without being through the dynamic warping procedure are superimposed together, there will generally be a rotational offset between the first and second images as the current calibration parameter is no longer able to calibrate the first and second images to the desired coordinate parameter relationship. Referring to FIG. 6B, the dynamic warping module 154 may take the first image as a basis, so that the second image may have the same horizontal angle as the first image through the adjustment of the dynamic warping procedure.

Then, in step S504, the dynamic warping module 154 obtains the depth information though the first and second images. By this way, during the period of accumulating the complete information to correct the current calibration parameter, the dynamic warping module 154 may perform an adaptively fine adjustment on a single group of images, such that the adjusted first and second images may be configured to calculate the image information of the depth information.

In summary, the invention is able to instantly detect whether the image deformation is occurred, in order for the image capturing device to perform the corresponding correction or calibration measure. That is to say, in the process of the user operating the image capturing device, the image capturing device of the invention is capable of detecting image deformation instantly and automatically, so as to further determine whether the phenomenon of the binocular lenses being rotated or displaced is occurred. When the image deformation is detected, the image capturing device of the invention may perform the further correction and improvement, in order to avoid continuously using the calibration parameters that no longer complied with the current situation to perform the image rectification. Besides, in one embodiment of the invention, when the image deformation is detected, the image capturing device of the invention may also perform the dynamic warping procedure on the single group of images currently captured, and thus the image capturing device is still able to obtain the correct depth information to carry out the next step of the application, so as to ensure the image capturing quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting image deformation, for an image capturing device having a storage unit, a first image sensor and a second image sensor, wherein the first image sensor and the second image sensor are disposed on the image capturing device with a spatial configuration relationship, wherein a current calibration parameter is stored in the storage unit and set corresponding to the spatial configuration relationship between the first image sensor and the second image sensor, the method comprising:

capturing a first image through the first image sensor, and capturing a second image through the second image sensor;

performing an image rectification on the first image and the second image through the current calibration parameter;

performing a deform detection according to the rectified first image and the rectified second image, so as to obtain a relative spatial information between the rectified first image and the rectified second image;

determining whether the current calibration parameter storing in the storage unit is complied with the spatial configuration relation by determining a coordinate parameter relationship between the first rectified image and the rectified second image is varied when the relative spatial information is not complied with a predefined condition, wherein the coordinate parameter relationship is associated with the spatial configuration relationship between the first image sensor and the second image sensor; and when the coordinate parameter relationship between the rectified first image and the rectified second image is varied, performing a dynamic warping procedure on the first rectified image and the rectified second image, so as to calibrate the coordinate parameter relationship between the rectified first image and the rectified second image.

2. The method according to claim 1, wherein the step of performing the deform detection according to the rectified first image and the rectified second image to obtain the relative spatial information between the rectified first image and the rectified second image comprises:

respectively performing a feature detection on the rectified first image and the rectified second image to obtain a plurality of first features of the rectified first image and a plurality of second features of the rectified second image;

comparing coordinate positions of the first features with coordinate positions of the second features respectively corresponding to the first features, so as to obtain a plurality of displacements between the first features and the second features; and calculating the displacements to obtain a relative rotational angle between the first image and the second image.

3. The method according to claim 2, before the step of respectively performing the feature detection on the rectified first image and the rectified second image to obtain the plurality of first features of the first image and the plurality of second features of the second image, further comprising:

determining whether the rectified first image and the rectified second image belong to a same image group according to image information of the first image and the second image.

4. The method according to claim 2, wherein the step of determining the coordinate parameter relationship between the rectified first image and the rectified second image is varied when the relative spatial information is not complied with the predefined condition comprises:

determining the coordinate parameter relationship between the rectified first image and the rectified second image is varied when the relative rotational angle is greater than a threshold value.

5. The method according to claim 1, wherein the first image sensor captures the first image for a target object and the second image sensor captures the second image for the target object, and the step of performing the deform detection according to the rectified first image and the rectified second image to obtain the relative spatial information between the rectified first image and the rectified second image comprises:

performing a three-dimensional depth estimation according to the rectified first image and the rectified second image to generate a corresponding depth information of the target object and obtaining a depth focus position associated with the target object according to the depth information;

obtaining an autofocus position associated with the target object through an autofocus procedure; and comparing the depth focus position and the autofocus position to obtain a focal length difference.

6. The method according to claim 5, wherein the step of determining whether the coordinate parameter relationship between the first image and the second image is varied when the relative spatial information is not complied with the predefined condition comprises:

determining the coordinate parameter relationship between the rectified first image and the rectified second image is varied when the focal length difference is greater than a threshold value.

7. An image capturing device, having a first image sensor and a second image sensor, wherein the first image sensor and the second image sensor are disposed on the image capturing device with a spatial configuration relationship, the image capturing device comprising:

a storage unit, recording a plurality of modules and a current calibration parameter corresponding to the spatial configuration relationship between the first image sensor and the second image sensor; and a processing unit, coupled to the first image sensor, the second image sensor and the storage unit to access and execute the modules recorded in the storage unit, and the modules comprising:

a capturing module, capturing a first image through the first image sensor and capturing a second image through the second image sensor;

a deform detecting module, performing an image rectification on the first image and the second image through the current calibration parameter, performing a deform detection according to the rectified first image and the rectified second image, so as to obtain a relative spatial information between the rectified first image and the rectified second image;

a determining module, determining a coordinate parameter relationship between the rectified first image and rectified the second image is varied when the relative spatial information is not complied with a predefined condition, wherein the coordinate parameter relationship is associated with a spatial configuration relationship between the first image sensor and the second image sensor; and a dynamic warping module, performing a dynamic warping procedure on the rectified first image and the rectified second image when the coordinate parameter relationship between the rectified first image and the rectified second image is varied, so as to calibrate the coordinate parameter relationship between the rectified first image and the rectified second image.

8. The image capturing device according to claim 7, wherein the deform detecting module respectively performs a feature detection on the rectified first image and the rectified second image to obtain a plurality of first features of the rectified first image and a plurality of second features of the rectified second image, the deform detecting module compares coordinate positions of the first features with coordinate positions of the second features respectively corresponding to the first features, so as to obtain a plurality of displacements between the first features and the second features, and the deform detecting module calculates the displacements to obtain a relative rotational angle between the rectified first image and the rectified second image.

9. The image capturing device according to claim 8, wherein the deform detecting module determines whether the rectified first image and the rectified second image belong a same image group according to image information of the rectified first image and the rectified second image.

10. The image capturing device according to claim 8, wherein the determining module determines the coordinate parameter relationship between the rectified first image and the rectified second image is varied when the relative rotational angle is greater than a threshold value.

11. The image capturing device according to claim 7, wherein the first image sensor captures the first image for a target object and the second image sensor captures the second image for the target object, and the deform detecting module performs a three-dimensional depth estimation according to the rectified first image and the rectified second image to generate a corresponding depth information of the target object, and the deform detecting module obtains a depth focus position associated with the target object according to the depth information, the deform detecting module obtains an autofocus position associated with the target object through an autofocus procedure, and the deform detecting module compares the depth focus position and the autofocus position to obtain a focal length difference.

12. The image capturing device according to claim 11, wherein the determining module determines the coordinate parameter relationship between the rectified first image and the rectified second image is varied when the focal length difference is greater than a threshold value.

* * * * *